Nov. 28, 1944.  H. G. DOSTER ET AL  2,363,508
MOLDING RUBBER ARTICLE
Filed July 23, 1940   3 Sheets-Sheet 1
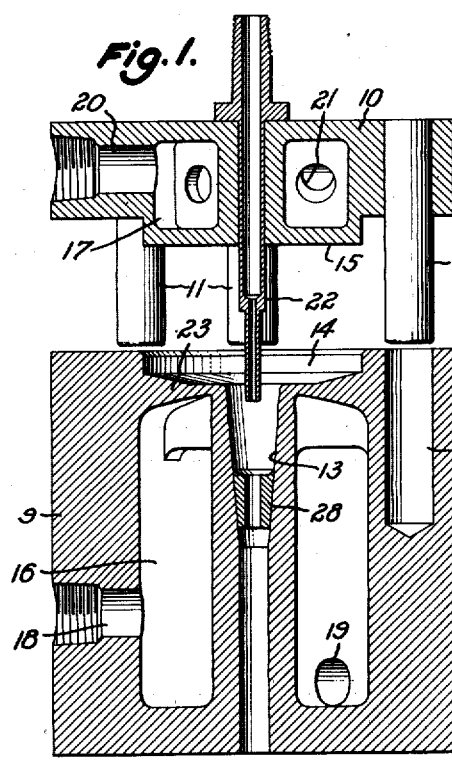
Fig. 1.
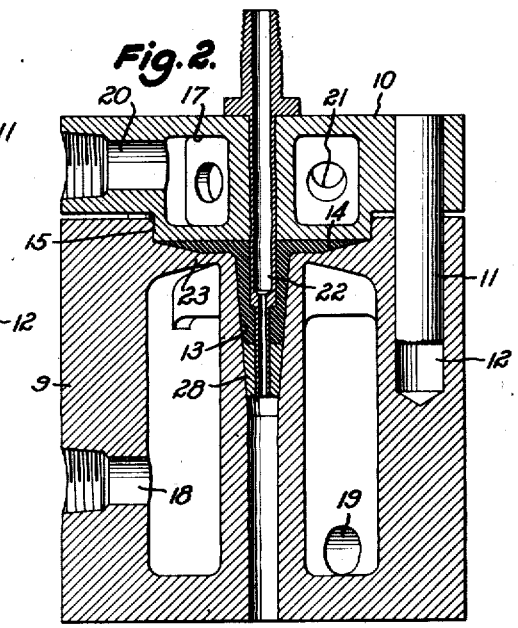
Fig. 2.
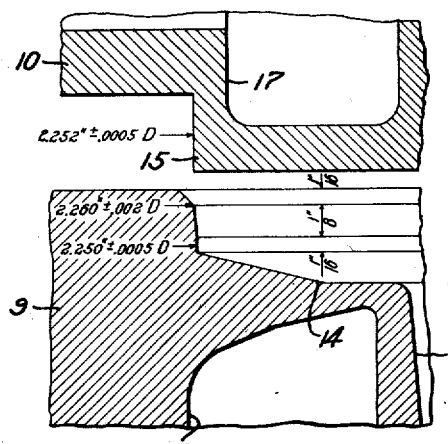
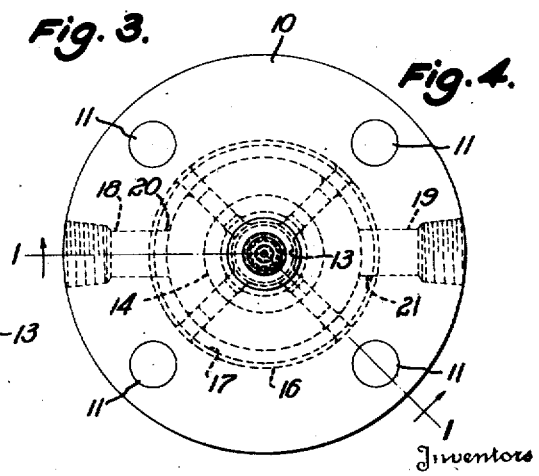
Fig. 3.   Fig. 4.
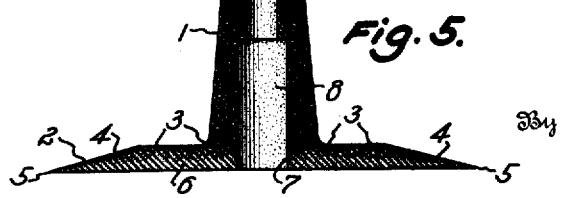
Fig. 5.
Inventors
Howard G. Doster
Robert H. Hanlon
W. F. Finkel Jr.
By
Attorney Electrical Insulation Nov. 28, 1944.    H. G. DOSTER ET AL    2,363,508
MOLDING RUBBER ARTICLE
Filed July 23, 1940    3 Sheets-Sheet 3

Inventors
Howard F. Doster
Robert H. Hanlon
By
W. H. Finckel Jr.
Attorney

Patented Nov. 28, 1944

2,363,508

UNITED STATES PATENT OFFICE 2,363,508

MOLDING RUBBER ARTICLES

Howard G. Doster, Wadsworth, and Robert H. Hanlon, Sharon Center, Ohio, assignors to The Ohio Injector Company, Wadsworth, Ohio, a corporation of Ohio Application July 23, 1940, Serial No. 347,056

4 Claims. (Cl. 18—53)

This invention relates to the molding and controlled curing of articles made from moldable plastics, particularly moldable and curable rubber compositions and their substitutes, and it has special reference to the molding and controlled curing of rubber inflation valve elements such as are customarily applied to, and which form a part of, inflatable vehicle tires, and, although the following description is directed primarily to the application of the invention to such rubber inflation valve elements, it will be understood that it is capable of advantageous application in fields of manufacture of other articles, especially where such articles are made of rubber and similar moldable and curable plastics.

It will be understood, therefore, that in the following description and claims where reference is made specifically to rubber, other vulcanizable plastic compositions and rubber substitutes are intended to be included.

In accordance with present common practice, rubber inflation valve elements of ordinary form, having stem portions and integral, radially-offstanding base flanges, are cured or vulcanized throughout as supplied to the manufacturer of the tires or other inflatable articles to which they are to be applied and of which they ultimately form, in effect, integral parts.

In applying such valve elements to the tires or other inflatable articles, it is necessary that the mating faces of the valve elements and tire tubes or articles be subjected to buffing or other roughening and cleaning operations, before they are cemented together or otherwise joined, in order that adequate adhesion may be obtained. And this is true respecting such valve elements even when they are applied to raw or uncured tubes and articles and are vulcanized to such tubes or articles during the ultimate curing of same.

It is the object of this invention to supply valve elements and other parts which may be applied to tire tubes and other articles during the curing of the latter in the vulcanizing molds without any preliminary preparation of either the valve elements and parts or of the tubes or articles as is now customary.

To this end the invention contemplates an inflation valve element or other part molded from raw or uncured vulcanizable rubber composition or plastic material in such a manner that, while certain of its portions, for example the stem portion and the stem-adjacent face of the base flange of a valve element are adequately cured, other portions, such as the face of the base flange of such valve element remote from the stem portion, that is to say its lower or under face, is substantially raw or uncured throughout its major extent and is susceptible of adhesion to, and ultimate curing or vulcanization with, a raw or uncured tube or article in the vulcanizing mold for the latter. In other words, valve elements and other parts as produced in accordance with the invention are ready for attachment by vulcanization to substantially raw or uncured tubes or articles, thus not only eliminating the usual preparatory steps, and the attendant labor, but producing a better union than has heretofore been possible, it being apparent that the substantially raw or uncured portions thereof and the substantially raw or uncured tube or article will, when fully cured or vulcanized, produce a unitary structure, as they have an affinity for each other and a tendency to flow and blend into each other under the influence of applied pressure and the heat of vulcanization during curing.

The invention contemplates, also, the method and apparatus by which molded parts, and particularly valve elements, having the characteristics of the invention may be produced, and applied to their carrying articles, all as will be explained hereinafter more fully and finally claimed.

In the accompanying drawings illustrating the invention, in the several figures of which like parts are similarly designated;

Figure 1 is an axial sectional elevation taken substantially on the line 1—1 of Fig. 4 illustrating one preferred form of molding means in accordance with the invention, the body and cover members of the mold being shown separated and empty.

Fig. 2 is a view similar to Fig. 1 but showing the mold closed and filled as at the beginning of a curing operation.

Fig. 3 is an enlarged fragmentary sectional elevation illustrating certain dimensional and structural refinements of the mating portions of the mold members.

Fig. 4 is a top plan view of the mold illustrated in Figs. 1 and 2.

Fig. 5 is an enlarged axial section of a finished valve element illustrating the curing thereof in accordance with the invention.

Figure 6:
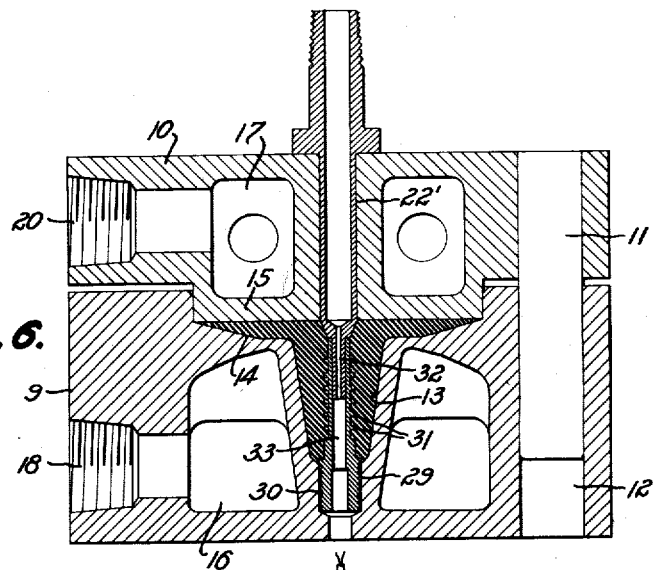
Fig. 6 is a slightly enlarged sectional elevation of a modified form of mold suitable for the incorporation with the valve element of a metal core or body member during the molding operation.

Referring to Fig. 5, in which a finished valve element and the controlled curing of the rubber composition of its various portions are best illustrated, it will be seen that the stem 1 is adequately and substantially fully cured throughout its wall, whereas the base or flange 2 is gradated in its condition of cure from substantially fully cured at portions 3 adjacent to the stem to partially cured at 4 adjacent to its peripheral edge 5 and preferably relatively raw or uncured at this edge and substantially throughout its face 6 remote from the stem which, as stated, will be referred to as its lower face. But it will be noted that a partial cure occurs in the area 7 immediately adjacent to the axial bore 8 of the stem where this bore passes through the base and there may occur also a partial cure at the peripheral edge 5. The extent and gradation of cure are, in a measure, indicated by stippling. The lightest stippling denotes substantially raw or uncured portions, and the heavier stippling denotes the proportional extent of cure.

The method and suitable means and apparatus whereby the valve elements of the invention may be produced in the preferred form just described will be explained in detail hereinafter.

However, it may here be noted that as a result there is produced a rubber valve element which has a finished cure in its upper portion or stem, and the base or flange of which is adequately cured upon its upper or stem-adjacent face to hold its shape, whereas the major portion of the lower face of the flange or base remains substantially raw or uncured and this, when it is applied to the surface of a substantially raw or uncured tube or other article, and the two are simultaneously cured or vulcanized, makes possible the blending of them together into an integral structure.

It will be noted, also, that because of the better bond thus obtained, as compared with that of common practice, it is possible to reduce the size of the base or flange, thus economizing in rubber stock used without sacrificing any practical advantages.

Although various apparatus may be devised for practicing the method of the invention, whereby valve elements in accordance therewith may be produced, and such apparatus may be of individual or multiple mold type and may be operated manually or automatically, as desired, several forms of apparatus are disclosed herein as illustrative.

Referring to Figs. 1 to 4 and 6 to 10, it will be seen that the apparatus is preferably in the form of a partible, cylinder-and-piston type mold, including a mold body 9, and a cover 10 separable from the body and guided into register therewith by dowel pins 11 cooperating with sockets 12.

The mold body 9 (see particularly Figs. 1, 2, 3 and 4) is provided with a mold cavity one portion 13 of which is shaped to form the stem 1 of the valve element, and this portion 13 merges into an annular enlargement 14 shaped to form the base 2 of the element. These parts may be considered as constituting the cylinder of the mold.

The cover 10 carries the piston 15 which is so designed as to appropriately fit the enlargement 14 under conditions of use, as will be explained in detail hereinafter, and the lower face of this piston forms a closure for the mold cavity and provides the molding surface for the lower face of the base 2 of the valve element.

Figure 7:
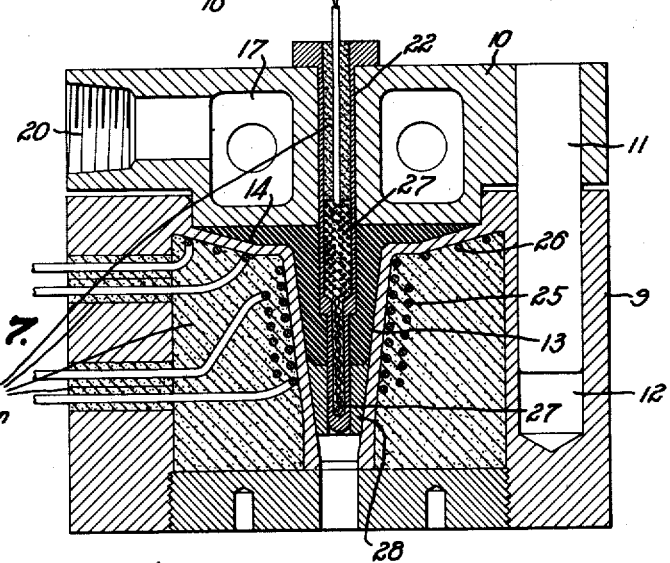
Fig. 7 illustrates a mold similar to that shown in Figs. 1 to 4 but in which electrical heating means are employed.

The body 9 and cover 10 are chambered at 16 and 17, respectively, for the reception of heating and cooling means which, in the forms of apparatus shown in Figs. 1 to 4, 6, 8, 9 and 10, may be, respectively, steam and water or other appropriate fluids, or, as shown in Fig. 7, the mold cylinder may be electrically heated and the cover fluid cooled, as will be explained later.

Steam will be admitted to the chamber 16 through an opening 18 to which it is appropriately piped, and water of condensation may drain from the chamber through a passage way 19 provided with a suitable steam trap (not shown). Cooling water is circulated through the chamber 17 of the cover by way of openings 20 and 21 to which it is piped.

The cover 10 carries an axially arranged tubular element 22 so shaped at its mold cavity-entering portion as to form in the mold a core which will provide an axial bore 8 in the molded valve element of the desired conformation. Steam or other heating fluid will be piped to this tubular element, as indicated in Figs. 1, 2, 4, 6, 9 and 10, or it may be provided with appropriate electrical heating means, as shown in Fig. 7.

Inasmuch as the mold body is heated and the mold cover is cooled, there will be relative expansion and shrinkage of their mating parts 14 and 15 under conditions of operation and, in order that a proper cylinder and piston fit may be provided between these parts, they are so designed and machined as to compensate for these characteristics. A workable set of proportions is shown in Fig. 3, but it will be understood that the dimensions there given are illustrative only and may be changed according to the size of the parts and the materials from which they are made.

Figure 8:
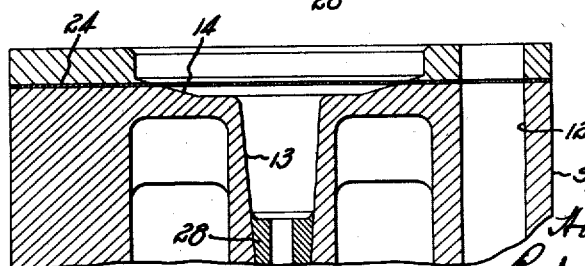
Fig. 8 illustrates, in fragmentary axial section, a further modified form of mold including a heat-insulating insert whereby the desired gradation of curing of the base flange may be accomplished.

It will be noted, moreover, that the wall 23 of the mold cavity at its portion 14 is of gradually increasing thickness radially outwardly for the purpose of properly controlling the curing effect of the heat upon the base 2 of the molded element. But, as shown in Fig. 8, the desired differential in curing effect in this particular may be obtained by providing in the mold body, adjacent to the portion 14 of the cavity, a heat insulating diaphragm or insert 24.

Other features of design, as illustrated in Fig. 3 will be explained more fully in connection with the description of the operation of the apparatus.

As shown in Fig. 7, the wall of the mold cavity may be of uniform thickness throughout the cylinder portion and the differential in curing action may be obtained by the provision of an electrical heating element 25 of relatively great heating effect surrounding the stem portion 13 and an electrical heating element 26 of relatively less heating effect adjacent to the annular base portion 14. Further modification of the curing action may be obtained by appropriate thickness of the cavity walls heated by the coils. The electrical heating means 27 in the tubular core element 22 may have desired adequate heating effect.

The closure member 28 at the bottom of the stem portion of the mold cylinder may be provided as a separate insert (Figs. 1, 2, 7 and 8), or it may be made as an integral part of the mold body 9 (Figs. 6 and 10), and it serves not only as a bottom for the mold cavity but as a guide and support for the tubular core element 22 to rigidly hold the same axially centered in the cavity when the mold is filled and closed.

Referring to Fig. 6, it will be seen that the method and apparatus may be well adapted to the molding in situ in the rubber stem element of a metal core or body 29 forming a part of the finished inflation valve. The core or body 29 may be seated in a socket 30 at the bottom of the mold cavity 13 and extends upwardly into the cavity, and it is preferably provided with spaced annular beads or ridges 31 to furnish a good bond with the rubber molded about it. In order that this core or body 29 may be more rigidly axially supported in the mold cavity, and to permit the passage of steam through it to attain proper curing of the contacting embracing rubber of the stem, the tubular core element 22' used in this connection is provided with a reduced extension 32 having a sliding cooperative fit within the bore 33 of the core or body 29.

Figure 9:
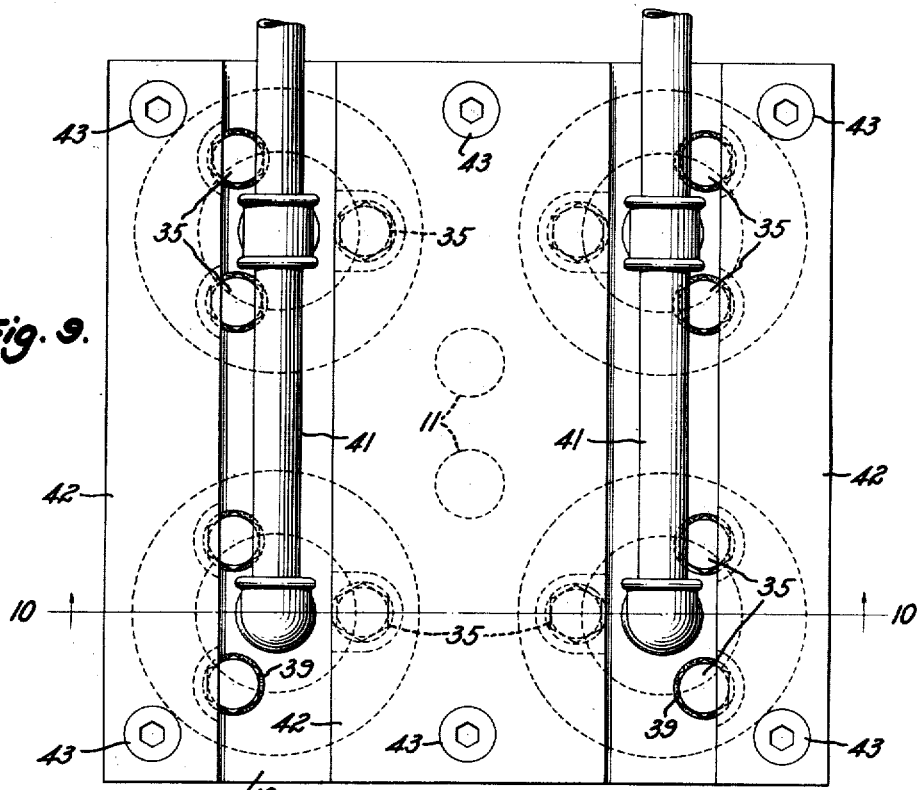
Fig. 9 is a top plan view of a multiple cavity mold embodying features of the invention.
Figure 10:
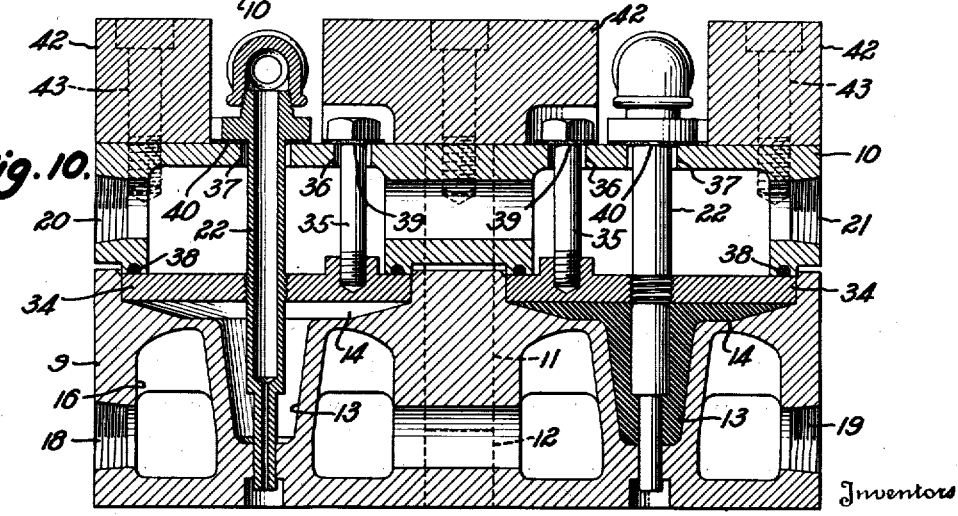
Fig. 10 is a sectional elevation taken on the line 10—10, Fig. 9.

In the multiple mold apparatus illustrated in Figs. 9 and 10 it will be apparent that, due to the characteristics of expansion and shrinkage of the mold body 9 and cover 10, some means must be provided for relative adjustment of the cavity-forming portions of the mold parts in order that they may appropriately register during use. To this end the piston elements of the cover may be in the form of separately attached plates 34 rigidly carrying the axially arranged core elements 22 and secured to the cover in a laterally or radially adjustable manner by means of bolts or cap screws 35 passing through enlarged openings 36 in the cover. Similar adjustment of the core elements 22 is made possible by enlarged openings 37 through which they pass through the cover. Appropriate fluid-sealing gaskets 38, 39 and 40 are preferably provided for the plates 34, cap screws 35 and core elements 22, as shown.

Obviously, when the parts have been once adjusted for cooperative engagement under predetermined operating temperatures, such adjustment may be maintained throughout a series of molding operations conducted under such established conditions, but, if the temperature conditions are altered, further accommodating adjustment must be made.

It will be seen that the tubular core elements 22 (Figs. 9 and 10) are supplied with heating fluid through headers or manifolds 41, and in order that these manifolds may be protected, when the mold parts are inserted in a press during the molding operation, guard or extension blocks 42 are fastened to the cover by cap screws 43 or other appropriate means.

The molding of rubber inflation valve elements in accordance with the method of the invention and employing apparatus of the nature disclosed, having reference particularly to Figs. 1 to 5, inclusive, may be described substantially as follows: First the mold cylinder 13—14 is sprayed, brushed or otherwise coated with an ordinary soap solution, and the piston 15 is treated with a lubricating wash which will prevent adhesion of raw rubber composition to it when the rubber composition is cold, but this wash should be such as to be absorbed by the rubber when heated. Then the cylinder of the mold is heated by steam introduced into the chamber 16 at a pressure and temperature in accordance with the curing specifications of the raw vulcanizable rubber composition used. The piston 15 of the mold is chilled or kept cool by circulation of water through the chamber 17 of the cover, and the water used for cooling is preferably ordinary tap water at a temperature of from 50° to 70° F. The steam employed in heating the mold cylinder is also piped to the tubular core element 22 and escapes therefrom through the choke bore at the end of the core element.

The raw vulcanizable rubber composition to be molded is cut in slugs of either circular lozenge form or of cylindrical form, with a hole punched in the center, and when the mold cover 10 is removed from the mold body 9, and the mold cavity thus opened, one of these slugs of raw rubber composition is placed upon the cool piston 15 by slipping it over the tubular core member 22. Each slug of rubber composition, as formed, is preferably of a predetermined weight or volume normally just sufficient to fill the mold cavity when the mold is closed, but it is possible to have a reasonable variation in this weight or volume, as any excess may be absorbed in a slight variation in the thickness of the base or flange of the molded valve element.

After the mold is closed, the body and cover being relatively guided by the dowel pins 11, the mold may, as a whole, be placed in any appropriate press, and the application of pressure to the cover will cause the raw rubber composition of the slug to completely fill the mold cavity.

In ordinary processes of molding, closing of the two parts of a mold under pressure would cause the rubber composition to flow out of the cavity between the piston and cylinder, but in the process of pressure molding in accordance with this invention, there is no overflow, for the reason that the raw rubber composition being in contact with the cool face of the piston 15 remains in a substantially raw or uncured state throughout the entire cure, and as raw or uncured rubber does not readily flow, that raw or uncured portion of the pressure molded rubber slug acts as a seal for the portion which becomes plastic under the influence of heat in the heated portions of the mold and seals the mold.

Here again, the particular design and proportioning of the cylinder and piston parts of the mold as shown in Fig. 3 come into play. It will be noted that at its upper portion 14 the cylinder wall opening is chamfered, then, throughout the major portion of its axial extent is slightly tapered, and throughout the remainder of its depth it is vertical. The relative dimensions of the mating parts of the mold whereby, under the effect of heating and cooling, they are given a perfect cylinder and piston fit, makes possible such cooperation that, should any of the rubber composition tend to exude, it will be trapped at the chamfered and tapered portions of the cylinder wall and will either be forced thence into the mold cavity or will be cut off where the tapered portion of the cylinder wall meets the final vertical portion thereof.

As hereinbefore mentioned, the wall 23 of the steam chamber 16 may be specially designed with a sloping curve which provides a gradual thickening of this wall radially outwardly so that a gradation of the heating effect may be obtained.

Thus, where the wall of the mold cavity is thin a greater degree of cure will be had than where it is thick, and this, as particularly applied to the base or flange 2 of the valve element, will result in the desired curing characteristics of its stem-adjacent face.

The cooling medium circulating through the chamber 17 of the mold cover maintains the whole cover, and especially the molding face of the piston 15 thereof, at a temperature below that necessary to effect curing of the rubber composition, and hence, throughout the entire curing cycle, the major portion of the face 6 of the base or flange 2 of the valve element remote from the stem 1 thereof will remain in a substantially raw or uncured state.

It results, therefore, that during the curing of the valve element the stem 1 thereof will be adequately cured by the heating effected exteriorly by the cavity wall 13 and interiorly by the core element 22 which forms the bore 8, whereas the base or flange 2 will receive a gradated, directional cure which leaves its face 6 raw or uncured, as stated.

It may be noted, here, that the fit between the core element 22 and the closure member 28 is such as to prevent escape of the rubber composition and to act as a cut-off. A similar fit is provided between the core element and the part of the cover with which it engages.

Of course, the time of curing will depend upon the nature of the rubber composition used, and when such time has elapsed the pressure will be released and the mold opened. The molded valve element will adhere to the chilled piston 15 of the cover when the mold is parted and, preferably when the heating medium has been cut off from the core element 22, the molded element may be stripped therefrom.

This process of controlled directional curing of molded rubber pioducts has been described above as a steam curing process with a tap water cooling medium. The basic idea of the process is to apply heating and cooling mediums in controlled amounts, and to design the mold cavities so as to give a directional or gradated degree of curing by heat transfer through the metal of the mold and which degree varies in proportion to the thickness of the metal between the heat source and the curing cavity. In addition to the steam heating medium and the water cooling medium other mediums can be applied to give comparable results.

As hereinbefore described, Fig. 7 shows a mold which is wired for application of electrical power to give heat where desired and in the degree desired through heating elements properly placed. As shown, the mold body 9 has two sets of wires 25 and 26. The set of wires 25 provides sufficient heat to give a complete cure to the stem portion of the valve element, and the set of wires 26 gives a lesser degree of heat on the flange or base. Also, by varying the thickness of metal through which this heat would flow, the gradated curing as described would result. Moreover, as has been stated, a set of wires 27 running up through the center of the core element 22 provides curing heat to the inside or bore of the stem.

Another means of obtaining the desired curing result would be to use a rubber compound which would cure only at high temperatures. Then by using a high pressure steam on that portion of the stem to be cured, the lower face of the base portion would remain uncured because of not attaining the high curing temperature of the compound, even though no cooling medium was circulated along that portion to be kept uncured. In other words, by proper compounding of the rubber composition and proper mold design, high temperature could be applied to that portion to be cured, and that portion to which the high temperature was not applied would remain uncured by the absence of applied heat.

It is also possible for the cooling medium to be of relatively high temperature. In other words, instead of cold water, any other hot liquid or gas might be circulated as a cooling medium, provided there is a differential between the applied high temperature and the applied low temperature and provided, further, that the compound has been made up to account for this differential application of heat.

Another method of performing a controlled cured molded rubber product would be to use two or more different kinds of rubber compounds. If in the rubber valve stem a slug of rubber is made up with the stem portion of a low temperature fast curing stock and the base or flange of a high temperature slow curing stock, then only the rubber stem would become cured if the differential was great enough in the rubber compound curing temperatures to allow the applied heat to be within the range of the curing temperature of the rubber stem but below the curing temperature of the compound in the flange or base.

Still another method would be to use a conventional heated mold in which the heat is only applied to the stem portion of the molded article and the base or flange portion is treated with a retarder which, under the curing process, would migrate into the rubber and would prevent the rubber base fom curing.

Where a metal insert, such as the core or body 29, Fig. 6, is placed in the mold cavity in place of the lower portion of the core element 22, a rubber stock would be employed which would be a good adhesion compound, and the metal insert would be so treated as to give good adhesion conditions. Thus, when the curing cycle would be completed, the metal insert would become permanently bonded to the rubber inside of the rubber valve stem and the base, as described, remain uncured.

Various changes and modifications are considered to be within the spirit of the invention and the scope of the following claims.

What we claim is:

1. The method of producing a rubber inflation valve element including a stem and a base flange, which includes the steps of filling a mold with vulcanizable rubber compound, and controlling the relative curing of the stem and base flange by differential application of heat thereto to effect a substantially complete cure of the stem while maintaining the face of the base flange uncured.

2. The method of producing a rubber inflation valve element including a stem and a base flange, which includes the steps of filling a mold with vulcanizable rubber compound and curing the stem by application of heat thereto while the face of the base flange remote from the stem is maintained uncured by cooling.

3. The method of producing a rubber inflation valve element including a stem and a base flange, said base flange being thinned outwardly to substantially a feather edge, which includes the steps of filling a mold with vulcanizable rubber compound, and controlling the relative curing of the stem and base flange by differential application of heat thereto, such application of heat to the base flange being gradated downwardly substantially in proportion to the thickness of said base flange to maintain the face of the base flange uncured while substantially completely curing the stem.

4. The method of producing articles of moldable plastic material including two members joined together by vulcanization, which includes the steps of furnishing one of said members in raw or uncured state and the other member with portions in cured state and portions in raw or uncured state, associating the members with the uncured portion of the latter in contact with the former and uniting the two by application of heat of vulcanization.

HOWARD G. DOSTER.
ROBERT H. HANLON.